United States Patent
Goldschmidt et al.

(10) Patent No.: US 6,375,134 B1
(45) Date of Patent: Apr. 23, 2002

(54) ADJUSTABLE CONTAINER HOLDER

(75) Inventors: Jack W. Goldschmidt, Allegheny County, PA (US); Ronald A. Rohm, 1155 Washington Rd., Pittsburgh, PA (US) 15228

(73) Assignee: Ronald A. Rohm, Pittsburgh, PA (US)

( * ) Notice: Subject to any disclaimer, the term of this patent is extended or adjusted under 35 U.S.C. 154(b) by 0 days.

(21) Appl. No.: 09/549,053

(22) Filed: Apr. 13, 2000

(51) Int. Cl.⁷ .............................................. A47G 23/02
(52) U.S. Cl. ........................ 248/154; 248/313; 248/310
(58) Field of Search .................................. 248/154, 151, 248/313, 310, 176.2, 346.03, 346.06, 146, 298.1, 295.11; 108/55.1, 55.3; 403/348, 350

(56) References Cited

U.S. PATENT DOCUMENTS

| | | | |
|---|---|---|---|
| 168,673 A | | 10/1875 | Rosenfeld |
| 630,734 A | | 8/1899 | Oothout |
| 1,350,970 A | * | 8/1920 | Hutchison et al. ..... 248/346.03 |
| 2,550,154 A | | 4/1951 | Kolacy |
| 3,368,655 A | | 2/1968 | Purdy |
| 3,589,525 A | * | 6/1971 | Allen ......................... 211/162 |
| 3,826,207 A | * | 7/1974 | Sutherlan ..................... 108/108 |
| 4,035,097 A | * | 7/1977 | Bachand ..................... 403/348 |
| 4,549,727 A | * | 10/1985 | Kozar ............................. 269/70 |
| 5,154,380 A | | 10/1992 | Risca |
| 5,398,898 A | | 3/1995 | Bever |
| 5,499,802 A | | 3/1996 | Haberle |
| 5,573,230 A | | 11/1996 | Lambertini |

* cited by examiner

Primary Examiner—Ramon O. Ramirez
Assistant Examiner—Holly N. Sy
(74) Attorney, Agent, or Firm—Buchanan Ingersoll, P.C.

(57) ABSTRACT

A holder device for holding containers of different sizes and shapes including, but not limited to, cups, plates, dishes and cookware. The holder device includes a base for supporting containers of different sizes and shapes, the base including a plurality of slots formed therein. A plurality of pegs are provided which are slidably received, one each, in the plurality of slots. Each of the plurality of pegs are independently securable against sliding movement in a plurality of positions along the lengths of the plurality of slots to accommodate containers of various sizes and shapes. The plurality of pegs are laterally engageable with a side periphery of a particular container when the container is supported on the base. Upon engagement with the container side periphery, the plurality of pegs are secured from sliding movement to secure the particular container against lateral movement while supported on the base.

18 Claims, 6 Drawing Sheets

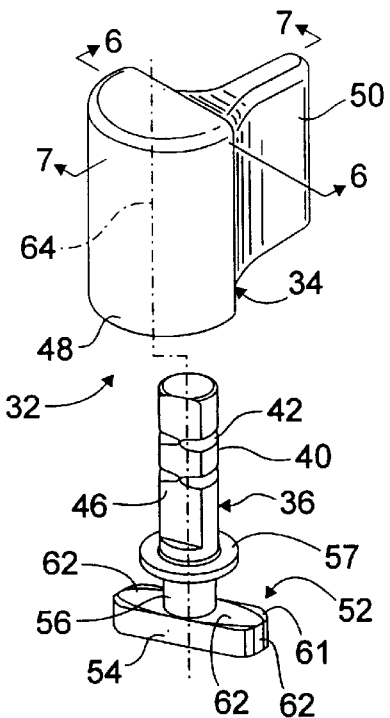
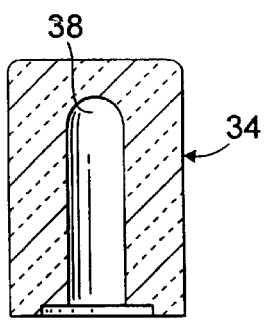
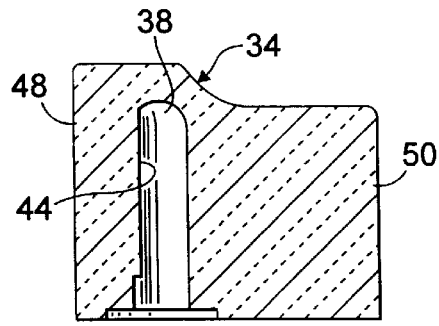

ADJUSTABLE CONTAINER HOLDER

FIELD OF INVENTION

The present invention is directed toward a device for holding containers and, more particularly, toward a device for holding containers of different sizes and shapes.

BACKGROUND OF THE INVENTION

Transporting containers from one location to another is an event that occurs multitudes of times daily. It may take the form of transporting a cooked food product from an oven or stove to a table for serving, or transporting uncooked food products to an area for cooking. An example of the latter case would be transporting uncooked meats, basting sauces, etc., from inside a house to a barbecue or grill outside of the house where the food will be prepared. Problems often arise when a food container is placed on a carrying device for transport thereof. The person transporting the container of food on the carrying device must be sure to maintain the carrying device in a level condition to prevent the food container from sliding off. This becomes a particular problem when more than one container of food is carried on a carrying device. The person must be sure to strategically disburse the weight of the various food containers equally across the surface of the carrying device for maintaining the carrying device in a level condition. Even then, a slight movement of the carrying device may shift the weight of the food containers resulting in any or all of the food containers sliding off the carrying device. The same concept applies to the transport of containers housing multitudes of contents other than food.

In the case of hot food dishes, the temperature of the food container must also be taken into account. Hotplates, as they are commonly referred to, are generally used to support cookware dishes on a table or countertop, thus shielding the table or countertop from the heat of the cookware dish. A hotplate generally consists of a piece of insulating material typically having legs extending from a bottom surface spacing the hotplate from the tabletop or countertop. At mealtime, food products may be prepared in the cookware, or casserole, dish, and the casserole dish carried to the table and placed on the hotplate for serving. Since the casserole dish will presumably be hot, the hotplate is necessary to shield the tabletop from the heat associated with the casserole dish. The same is true if the casserole dish is allowed to cool on a countertop for a few minutes prior to serving. Upon the casserole dish, including the prepared food product, being placed on the table, those consuming the meal may take servings sized to their respective appetites.

Problems often arisen when a particular food product is prepared at one location and transported to a different location. For instance, consider a food product initially permitted to cool on a countertop prior to serving, such as casseroles, brownies, etc. Since the dish or pan in which the food product was prepared will still be hot, a person must lift the dish or pan using oven mitts, or the like, and transport not only the dish or pan but also the hotplate to the table so that the tabletop is not damaged by the heat of the dish or pan being placed thereupon. This may either require two people, one for the dish or pan and one for the hotplate, or two hotplates, one on the countertop and one on the table.

The problem of transporting food products, hot and cold, is particularly prevalent during holidays or other special occasions where there is a large gathering of people. Typically, the various individuals attending the gathering will each prepare a food product, e.g., entree, appetizer, dessert, etc., which must then be transported to the gathering location for consumption by those attending. Conventional hotplates and other carrying devices are inadequate for such transportation since they only provide for vertical support of the food container. If transportation of the food container is by vehicle, the food container will simply slide off conventional hotplates or other conventional carrying devices upon the vehicle making a turn or a sudden start or stop. If there is no lid for the food container, as is typically the case for a pie or cake, or if the lid is on loosely, this may result in considerable mess to the vehicle.

An alternative means of transporting a food container by vehicle is for a person to hold the food container, using oven mitts or the like if the container is hot, on his or her lap, or to place the food container on the floor of the vehicle and prevent the food container from lateral movement with his or her feet or hands. This can be considerably burdensome, especially if the distance to be traveled is long. Moreover, holding the food container on the lap of the person may result in injury to the person if the food in the container is hot and spillage results.

The present invention is directed toward overcoming one or more of the above-mentioned problems.

SUMMARY OF THE INVENTION

A holder device is provided for holding containers of different sizes and shapes including, but not limited to, cups, plates, dishes and cookware. The holder device includes a base for supporting containers of different sizes and shapes, the base including at least three slots extending radially from a common center point. At least three pegs are provided which are slidably received, one each, in the at least three slots. Each of the at least three pegs are independently securable against sliding movement in a plurality of positions along the lengths of the at least three slots to accommodate containers of various sizes and shapes. The at least three pegs are laterally engageable with a side periphery of a particular container when the container is supported on the base. Upon engagement with the container side periphery, the at least three pegs are secured from sliding movement to secure the particular container against lateral movement while supported on the base.

Each of the at least three pegs, when received in the at least three slots, are independently rotatable between a first position defining a slidingly moveable position and a second position defining a secured position wherein the peg is prevented from sliding movement. In the first position, the at least three pegs may be slidingly moved along the lengths of the slots to engage a side periphery of a container supported on the base. The at least three pegs may then be rotated to the second position to secure the container supported on the base from lateral movement.

In one form, the at least three pegs are secured against sliding movement the via frictional forces developed between the at least three pegs and slot slides with the at least three pegs in the second position.

In another form, the at least three pegs are independently securable against sliding movement in an infinite number of positions along the lengths of the at least three slots to accommodate containers of various sizes and shapes.

In still another form, the at least three slots include T-slots having a wide base region, a narrow neck region, and a pair of shoulder surfaces separating the regions. The at least three pegs include a cooperating T-shaped section having a wide base portion and a narrow neck portion. The wide base portion has a first dimension slightly narrower than the narrow neck region and a second dimension slightly wider than the wide base region. The narrow neck portion is sized to slide in the narrow neck region. With the at least three pegs rotated to the first position, the wide base portion is positioned to pass through the narrow neck region of the T-slot to be received therein. With the at least three pegs received in the T-slots and rotated to the second position, the wide base portion frictionally engages slot sides defining the wide base region securing the at least three pegs against sliding movement.

In yet another form, ends of the wide base portion defining the second dimension include a compressible material. With the at least three pegs received in the T-slots and in the second position, the compressible material is compressed by the slot sides defining the wide base region developing frictional forces therebetween to frictionally secure the at least three pegs against sliding movement.

In a further form, the wide base portion of the T-shaped section includes a top surface with a compressible material provided thereon, with the second dimension of the wide base portion sized slightly narrower than the wide base region but wider than the narrow neck region. With the at least three pegs received in the T-slots and in the second position, the at least three pegs are secured against sliding movement via frictional forces developed between the pair of shoulder surfaces and the compressible material provided on the top surface of the wide base portion.

In still a further form, with the at least three pegs received in the T-slots and in the second position, the at least three pegs are secured against sliding movement via cooperating structures formed on the base and the T-shaped section. The cooperating structures may include, for example, cooperating detents and projections.

In yet a further form, the at least three slots do not extend radially from a common center point but rather include a plurality of slots formed in the base, either randomly or in the form of a design, such that containers of different sizes and shapes may be supported on the base and secured against lateral movement.

The base preferably is made of a heat insulating material, such as wood, plastic, and the like.

In a preferred form, the at least three radially extending slots are spaced equidistantly apart on the base.

The base preferably is rectangular in shape and includes handles for carrying the holder with a container securely supported thereon.

It is object of the present invention to provide a holder for a casserole dish or other container of food for safe and easy transport of the container of food.

It is a further object of the present invention to provide a holder for securely holding in an upright position food containers of different sizes and shapes.

It is yet a further object of the present invention to provide a holder for securely transporting hot containers of food.

Other objects, aspects and advantages of the present invention can be obtained from a study of the specification, the drawings, and the appended claims.

BRIEF DESCRIPTION OF THE FIGURES

FIG. 5 is an exploded perspective view of a peg including the inventive adjustable container holder;

FIG. 6 is a sectional view taken along line 6—6 in FIG. 5;

FIG. 7 is a sectional view taken along line 7—7 in FIG. 5;

DETAILED DESCRIPTION OF THE INVENTION

Figure 1:
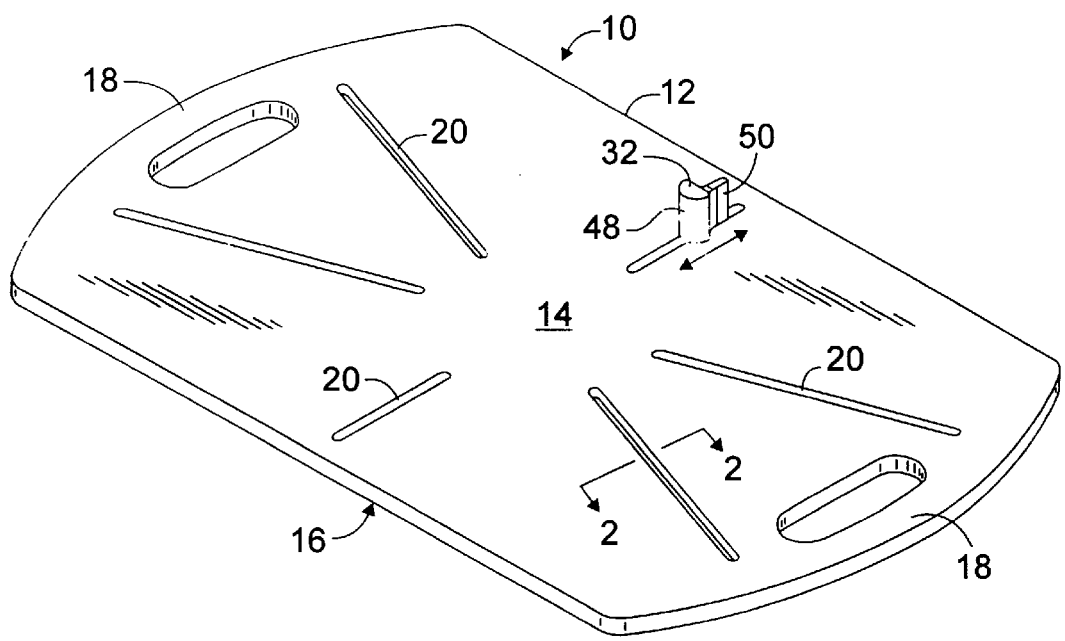
FIG. 1 is a perspective view of an adjustable container holder according to the present invention with one peg illustrated.
Figure 2:
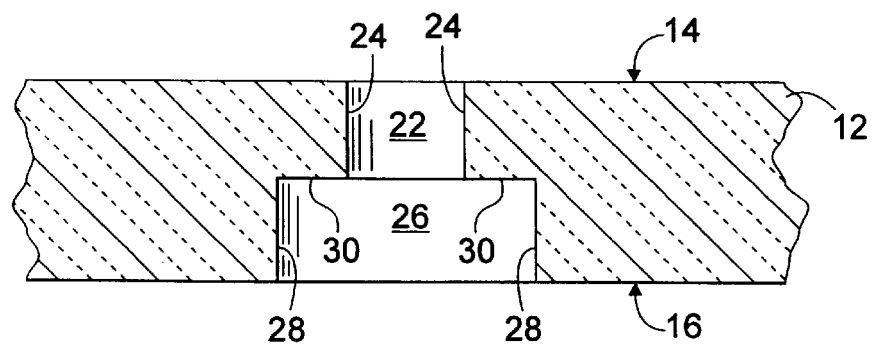
FIG. 2 is a sectional view taken along line 2—2 in FIG. 1.
Figure 3:
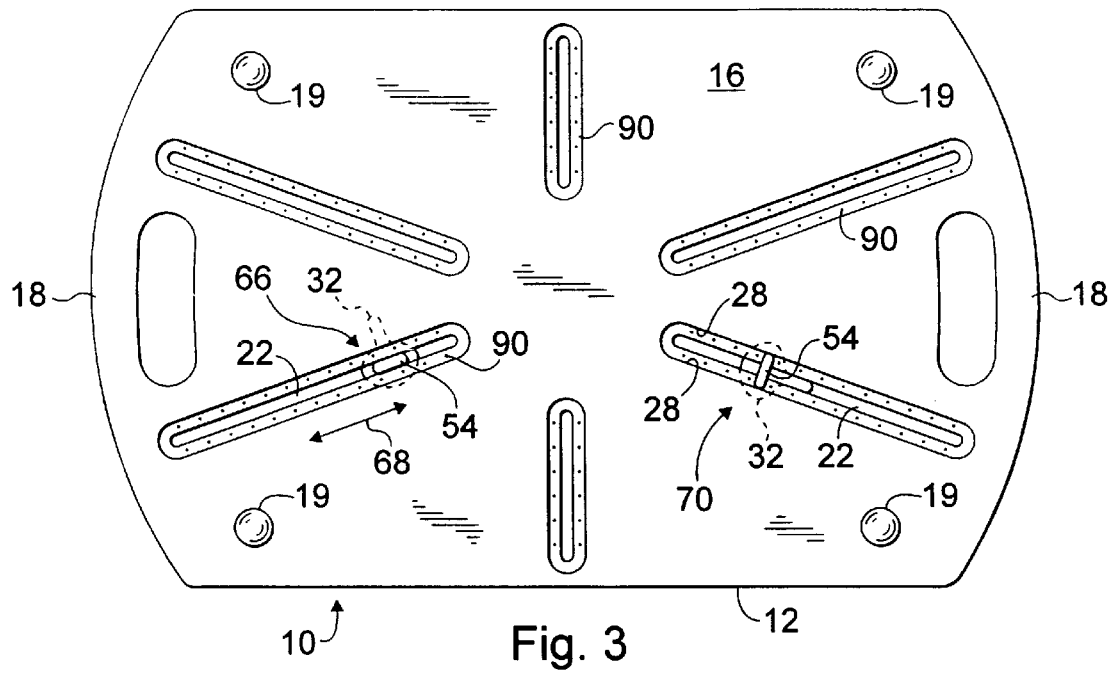
FIG. 3 is a bottom view of the adjustable container holder shown in FIG. 1.

Referring to FIGS. 1–3, an adjustable container holder according to the present invention is shown at 10. The adjustable container holder 10 includes a base 12 having opposing top 14 and bottom 16 surfaces. Handles 18 are formed at opposing ends of the adjustable container holder 10 for ease of carrying the adjustable container holder 10 with a food container supported thereon. Preferably, the base 12 is rectangular in shape and is made of wood or plastic. However, the base 12 may take any shape and may be made of virtually any type of heat insulating material capable of withstanding heat normally associated with hot food dishes. Legs 19 are provided and extend from the bottom surface 16 of the base 12 spacing the base 12 from a table or countertop providing further heat insulating effects. While the legs 19 are preferably made of rubber, virtually any material may be used therefor.

A plurality of slots 20 are formed in the base 12, with each of the slots 20 extending radially from a common center point. While the adjustable container holder 10 illustrated and described herein depicts six radially extending slots 20 formed in the base 12, any number of radially extending slots may be formed in the base 12 without departing from the spirit and scope of the present invention. It is preferably contemplated that at least three radially extending slots 20 are required to adequately support and secure a container on the base 12.

Figure 4:
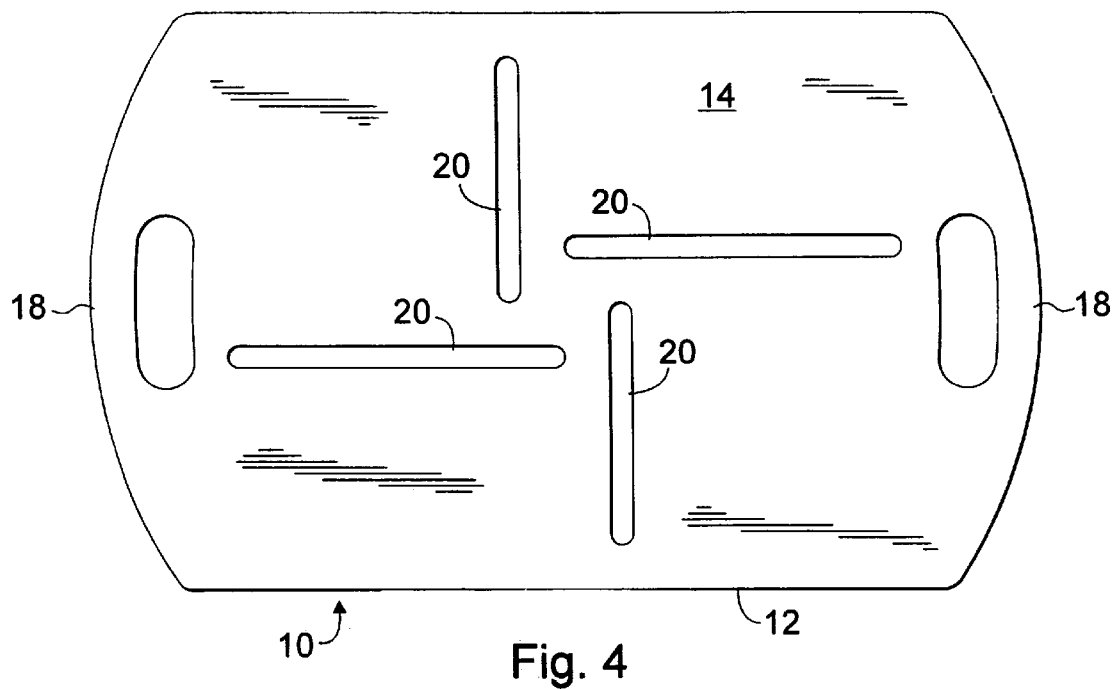
FIG. 4 is a top view of the adjustable container holder with an alternate slot configuration.

In an alternate form of the present invention, the slots 20 are not required to extend radially from a common center point. One such configuration is illustrated in FIG. 4. The adjustable container holder 10' includes a plurality of slots 20 formed in the base 12 which do not extend radially from a common center point, but rather form a design configuration. It should be understood that other slot configurations may be utilized to secure containers of different sizes and shapes supported on the base against lateral movement without departing from the spirit and scope of the present invention. The slots 20 may be formed randomly in the base 12 or formed such that they create a design configuration. Again, it is preferably contemplated that at least three slots 20 are required to adequately support and secure a container on the base 12.

As shown more particularly in FIG. 2, the slots 20 are preferably T-slots opening at both the top 14 and the bottom 16 surfaces. The T-slots 20 each include a narrow neck region 22 defined by slot sides 24 and a wide base region 26 defined by slot sides 28. A pair of shoulder surfaces 30 extend parallel to the top surface 14 and separate the narrow neck 22 and wide base 26 regions from each other. The T-slots 20 are standard and can be of different widths. Moreover, it is not necessary that the T-slots 20 open at the bottom surface 16.

The adjustable container holder 10 further includes a plurality of pegs 32, preferably equal in number to the number of slots 20, removably receivable in the T-slots 20 for guided sliding movement in the T-slots 20. For convenience, only one peg 32 is shown in FIG. 1 and two pegs 32 are shown in FIG. 3.

FIGS. 5–7 illustrate a preferred form of the peg 32. The peg 32 includes top 34 and bottom 36 portions which are manufactured separately and secured together. The top portion 34 includes a bore 38 formed therein which receives a shaft portion 40 of the bottom portion 36 and are secured together via glue or other conventional means. When glue is used as the securing means, gouges 42 are formed in the shaft portion 40 which accumulate glue and aid in securing the top 34 and bottom 36 portions together. The top 34 and bottom 36 portions are further keyed together for rotation via cooperating flat surfaces 44 and 46 formed in the bore 38 and on the shaft portion 40, respectively.

The top portion 34 includes a container engaging portion 48 and a handle portion 50. The bottom portion 36 includes a T-shaped section, shown generally at 52, including a wide base portion 54, a narrow neck portion 56 and a flange 57 on top of the narrow neck portion 56. The wide base portion 54 includes a first dimension, shown at 58 in FIG. 7, slightly narrower than the narrow neck region 22 of the T-slots 20. The wide base portion 54 further includes a second dimension, shown at 60 in FIG. 6, slightly wider than the wide base region 26 of the T-slots 20. The narrow neck portion 56 is sized to slide in the narrow neck region 22 of the T-slots 20. With the pegs 32 inserted in the slots 20, the flange 57 rests on the top surface 14 of the base 12.

The wide base portion 54 includes a top surface 61 having a compressible material 62, such as a polyethylene plastic or other suitable elastomer, provided thereon and extending to the ends of the wide base portion 54. The top portion 34 is preferably made of wood or plastic, while the bottom portion 36 is preferably made of a plastic. However, virtually any rigid material may be used for either the top portion 34 or the bottom portion 36 without departing from the spirit and scope of the present invention. Further, the particular construction of the peg 32 described herein should be considered exemplary only and various other peg configurations and constructions may be implemented without departing from the spirit and scope of the present invention. For example, the container engaging portion 48 and handle portion 50 may take virtually any shape, and, in view of various manufacturing considerations, the pegs 32 may be molded as a unitary member with the entire peg 32, or select portions thereof, made of a compressible material. Cooperating operation of the pegs 32 with the base 12 will now be described with reference to FIGS. 1–3 and 5–7.

With the peg 32 rotated about its axis 64 to a first position shown at 66 in FIG. 3, the wide base portion 54 is positioned to pass through the narrow neck region 22 of the T-slot 20. Upon the wide base portion 54 being received in the T-slot 20, the flange 57 engages the top surface 14 of the base 12 and the peg 32 is slidingly moveable along the length of the T-slot 20 as shown by arrow 68. The peg 32 may be moved to a desired position along the length of the T-slot 20 and rotated again about its axis 64 to a second position shown at 70 in FIG. 3. In this position, the wide base portion 54 frictionally engages the slot sides 28 defining the wide base region 26 thus securing the peg 32 against sliding movement in the T-slot 20. Further, in the second position 70, the peg 32 is prevented from being removed from the T-slot 20 via the shoulder surfaces 30 and wide base portion 54. More specifically, with the peg 32 in the second position 70, the compressible material 62 engages the slot sides 28 and is compressed thereby. Frictional forces are developed therebetween to frictionally secure the peg 32 against sliding movement in the T-slot 20. In this manner, the pegs 32 are independently securable against sliding movement in an infinite number of positions along the lengths of the T-slots 20.

Figure 12:
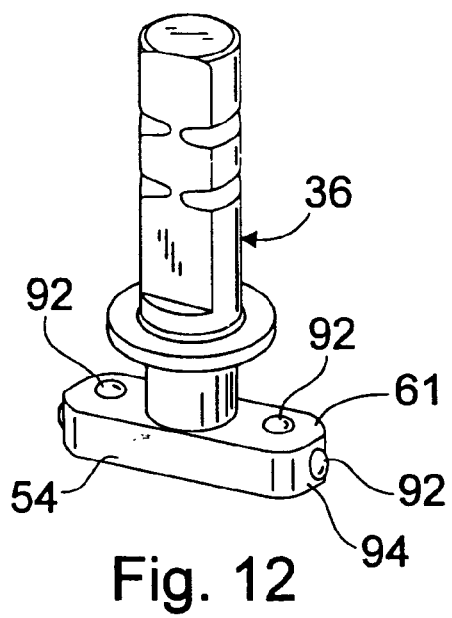
FIG. 12 is a perspective view of an alternate embodiment of the bottom portion of the peg included in the adjustable container holder.
Figure 13:
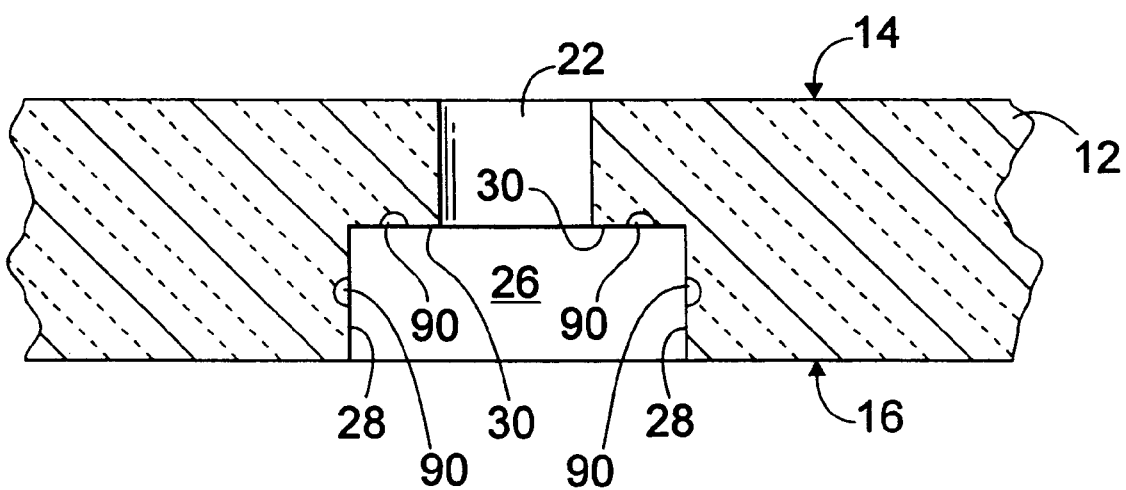
FIG. 13 is a sectional view taken along the line 2—2 in FIG. 1 illustrating detents formed in the slot surfaces.

It should be understood that various other cooperating peg 32 and slot 20 configurations may be implemented without departing from the spirit and scope of the present invention. For example, the second dimension 60 of the wide base portion 54 may be sized slightly narrower than the wide base region 26 but wider than the narrow neck region 22. The narrow neck portion 56 and flange 57 are respectively sized and positioned such that with the peg 32 rotated to the second position 70, the compressible material 62 on the top surface 61 of the wide base portion 54 engages the shoulders 30 and is compressed thereby. Frictional forces are developed therebetween to frictionally secure the peg 32 against sliding movement in the slot 20. Further, with the second dimension 60 of the wide base portion 54 sized slightly wider than the wide base region 26, frictional forces may be developed at both the slot sides 28 and shoulders 30 to frictionally secure the peg 32 against sliding movement in the slot 20. Still further, instead of using a compressible material 62 to frictionally secure the peg 32 against sliding movement, the peg 32 may be secured via cooperating elements formed on the base 12 and T-shaped section 52. For example, a plurality of detents 90 (see FIGS. 3 and 13) could be formed along the slot 20 on slot sides 24 or 28, or on the shoulders 30. With the peg 32 in the second position 70, these detents 90 would engage cooperating projections 92 (see FIG. 12) formed on the top surface 61 or ends 94 of the wide base portion 54 of the T-shaped section 52 to secure the peg 32 against sliding movement. While the projections 92 have been shown as formed on the wide base portion 54 with the cooperating detents 90 formed along the slot 20, it should be understood that the projections may be formed along the slot 20 with the cooperating detents formed in the wide base portion 54 without departing from the spirit and scope of the present invention.

Additionally, the slots 20 may be simply conventional slots extending from the top 14 to bottom 16 surfaces instead of T-slots. Using conventional slots 20, the T-shaped section 52 may be sized such that the peg 32 in the first position 66 is slidingly moveable in the slot 20. With the peg 32 in the second position 70 the ends of the wide base portion 54 frictionally engage the slot sides, via the compressible material 62 or cooperating detents/projections, to secure the peg 32 against sliding movement. Alternatively, the T-shaped section 52 may be sized such the wide base portion 54 extends through the slot 20 with the peg 32 received therein. In this alternate form, in the first position 66, the peg 32 is slidingly moveable in the slot 20. The narrow neck portion 56 and flange 57 are respectively sized and positioned such that with the peg 32 rotated to the second position 70, the top surface 61 of the wide base portion 54 frictionally engages the bottom surface 16 of the base 12, via the compressible material 62 or cooperating detents/projections, to secure the peg 32 against sliding movement.

It should be understood that the various cooperating peg 32 and slot 20 configurations described herein are for exemplary purposes only, and any combination of the configurations described above, as well as various other configurations, may be utilized without departing from the spirit and scope of the present invention.

Figure 8:
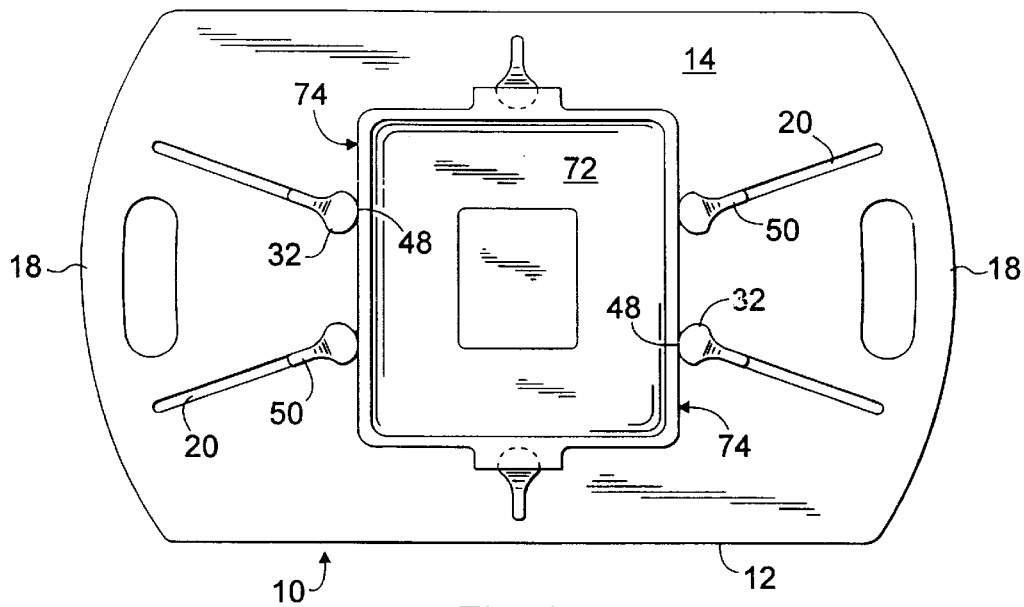
FIG. 8 is a top view of the inventive adjustable container holder utilized with a squareshaped casserole dish.
Figure 9:
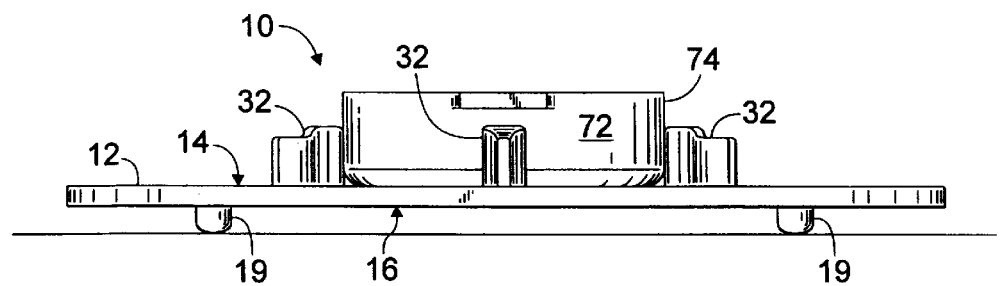
FIG. 9 is a side view of the inventive adjustable container holder utilized with a squareshaped casserole dish.

Due to the independent moveability and lockability of the pegs 32, virtually any size and shape container may be supported on the base 12 and secured against lateral movement. For example, as shown in FIGS. 8–9, the adjustable container holder 10 may be utilized to support a square-shaped food container such as a casserole dish 72. The casserole dish 72 is set on the top surface 14 of the base 12. The pegs 32 are rotated to the first position (66 in FIG. 3), inserted into the T-slots 20, and slidably moved along the length of the T-slots 20 until they engage a side periphery 74 of the casserole dish 72. The pegs 32 are then rotated to the second position (70 in FIG. 3) such that their container engaging surfaces 48 rest snug against the side periphery 74 of the casserole dish 72. The casserole dish 72 may then be moved or transported on the adjustable container holder 10 and is thus prevented from lateral movement thereon via the secured pegs 32.

Figure 10:
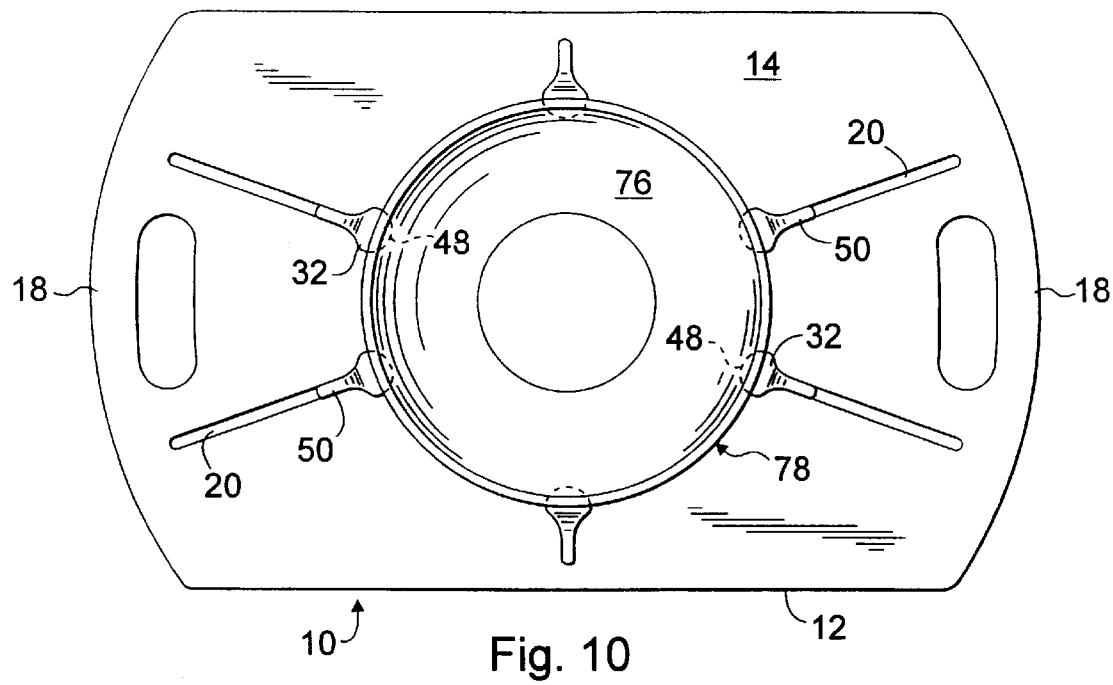
FIG. 10 is a top view of the inventive adjustable container holder utilized with a circular bowl-shaped dish.
Figure 11:
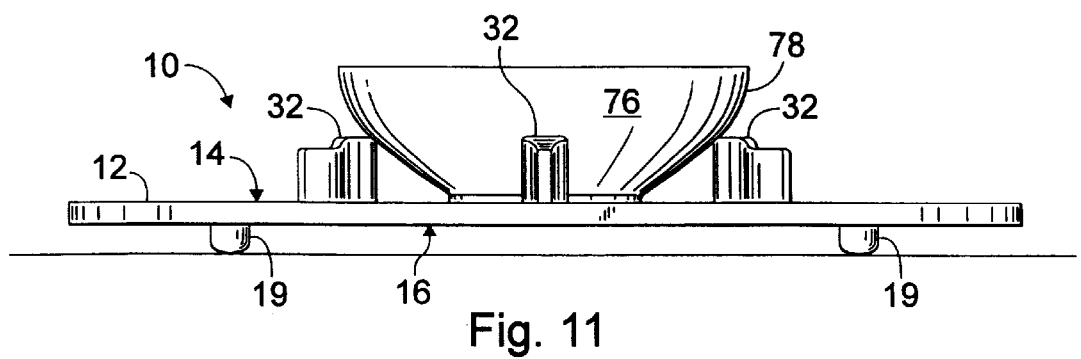
FIG. 11 is a side view of the inventive adjustable container holder utilized with a circular bowl-shaped dish.

As previously noted, the adjustable container holder 10 may be utilized with virtually any size and shape container. FIGS. 10–11 illustrate the adjustable container holder 10 utilized in connection with a circular food container such as a bowl-type dish 76. Similar to that previously described, the bowl 76 is set on the top surface 14 of the base 12. The pegs 32 are rotated to their first position (66 in FIG. 3) and inserted into the T-slots 20. The pegs 32 are slidingly moved until they engage a side periphery 78 of the bowl 76. The pegs 32 are rotated to their second position (70 in FIG. 3) such that their engaging surfaces 48 rest snugly against the side periphery 78 of the bowl 76. In this manner, the bowl 76 may be moved or transported on the adjustable container hole 10 and is thus prevented from lateral movement thereon via the secured pegs 32.

While the present invention has been described with particular reference to the drawings, it should be understood that various modifications could be made without departing from the spirit and scope of the present invention. For example, while the adjustable container holder 10,10' has been described herein relation to the transport of containers of food products, such description has been for exemplary purposes only. The inventive adjustable container holder 10,10' may be utilized with any type of container with multitudes of contents, or any article for that matter, for prohibiting lateral movement thereof during transport.

We claim:

1. A holder for holding containers of different sizes and shapes including cups, plates, dishes and cookware, said holder comprising:
   a base for supporting containers of different sizes and shapes, the base including a plurality of slots formed therein; and
   a plurality of pegs slidably received, one each, in the plurality of slots, the plurality of pegs independently securable against sliding movement in a plurality of positions along the lengths of the plurality of slots to accommodate containers of various sizes and shapes, the plurality of pegs laterally engageable with a particular container when the container is supported on the base,
   wherein the plurality of pegs are independently rotatable between a first position wherein the plurality of pegs are slidingly moveable within the plurality of slots and a second position wherein the plurality of pegs are secured against sliding movement within the plurality of slots.

2. The holder of claim 1, wherein the plurality of pegs are secured against sliding movement via frictional forces developed between the plurality of pegs and slot sides with the plurality of pegs in the second position.

3. The holder of claim 1, wherein the plurality of pegs are secured against sliding movement via cooperating detents and projections formed on the plurality of pegs and slots, the cooperating detents and projections engaging and securing the plurality of pegs with the plurality of pegs in the second position.

4. The holder of claim 1, wherein the plurality of slots each include T-slots having a wide base region and a narrow neck region, and the plurality of pegs include a cooperating T-shaped section having a wide base portion and a narrow neck portion, wherein with the plurality of pegs rotated to the first position the wide base portion is positioned to pass through the narrow neck region of the plurality of slots, and wherein with the plurality of pegs rotated to the second position the wide base portion is positioned to be unable to pass through the narrow neck region of the plurality of slots and frictionally engages slot sides defining the wide base region securing the plurality of pegs against sliding movement.

5. The holder of claim 4, wherein ends of the wide base portion include a compressible material which engages the slot sides defining the wide base region with the plurality of pegs in the second position and is compressed thereby developing frictional forces therebetween to frictionally secure the plurality of pegs against sliding movement.

6. The holder of claim 1, wherein the plurality of slots each include T-slots having a wide base region, a narrow neck region and a pair of shoulder surfaces separating the base region and the narrow neck region, and the plurality of pegs include a cooperating T-shaped section having a narrow neck portion and a wide base portion having a top surface, wherein with the plurality of pegs rotated to the first position the wide base portion is positioned to pass through the narrow neck region of the plurality of slots, and wherein with the plurality of pegs rotated to the second position the wide base portion is positioned to be unable to pass through the narrow neck region of the slots and the top surface of the wide base portion frictionally engages the shoulder surfaces securing the plurality of pegs against sliding movement.

7. The holder of claim 6, wherein the top surface of the wide base portion includes a compressible material which engages the shoulder surfaces with the plurality of pegs in the second position and is compressed thereby developing frictional forces therebetween to frictionally secure the plurality of pegs against sliding movement.

8. The holder of claim 6, wherein the top surface of the wide base portion includes detents or projections which engage cooperating projections or detents formed on the shoulder surfaces with the plurality of pegs in the second position to frictionally secure the plurality of pegs against sliding movement.

9. The holder of claim 1, wherein the plurality of pegs each include a T-shaped section having a narrow neck portion and a wide body portion having a top surface, wherein with the plurality of pegs rotated to the first position the wide base portion is positioned to pass through the plurality of slots, and wherein with the plurality of pegs rotated to the second position the wide base portion is positioned to be unable to pass through the slots and the top surface of the wide base portion frictionally engages a bottom surface of the base securing the plurality of pegs against sliding movement.

10. The holder of claim 9, wherein the top surface of the wide base portion includes a compressible material which engages the bottom surface of the base with the plurality of pegs in the second position and is compressed thereby developing frictional forces therebetween to frictionally secure the plurality of pegs against sliding movement.

11. The holder of claim 9, wherein the top surface of the wide base portion includes detents or projections which engage cooperating projections or detents formed on the bottom surface of the base with the plurality of pegs in the second position to frictionally secure the plurality of pegs against sliding movement.

12. A holder for holding containers of different sizes and shapes including cups, plates, dishes and cookware, said holder comprising:

a base for supporting containers of different sizes and shapes, the base including a plurality of slots formed therein; and a plurality of pegs removeably received, one each, in the plurality of slots for guided sliding movement therein, the plurality of pegs independently slidable in each of the plurality of slots and independently securable against sliding movement in a plurality of positions along the lengths of each of the plurality of slots to accommodate containers of various sizes and shapes, the plurality of pegs laterally engageable with a particular container when the container is supported on the base, wherein the plurality of pegs are independently rotatable between a first position wherein the plurality of pegs are slidingly moveable within the plurality of slots and a second position wherein the plurality of pegs are secured against sliding movement within the slots.

13. The holder of claim 12, wherein the plurality of pegs are secured against sliding movement via frictional forces developed between the plurality of pegs and slot sides with the plurality of pegs in the second position.

14. The holder of claim 12, wherein the plurality of pegs in the first position are removable from, and insertable in, the plurality of slots, and the plurality of pegs in the second position are non-removable from, and non-insertable in, the plurality of slots.

15. The holder of claim 12, wherein the plurality of slots each include T-slots having a wide base region and a narrow neck region, and the plurality of pegs each include a cooperating T-shaped section having a wide base portion and a narrow neck portion, the wide base portion having a first dimension narrower than the narrow neck region and a second dimension wider than the narrow neck region, and the narrow neck portion sized to slide in the narrow neck region, wherein with the plurality of pegs rotated to the first position the wide base portion is positioned to pass through the narrow neck region of the plurality of slots, and wherein with the plurality of pegs received in the plurality of slots and rotated to the second position the wide base portion is positioned to be incapable of passing through the narrow neck region of the plurality of slots and frictionally engages slot sides defining the wide base region securing the plurality of pegs against sliding movement.

16. The holder of claim 15, wherein ends of the wide base portion defining the second dimension include a compressible material which engages the slot sides defining the wide base region the plurality of pegs in the second position and is compressed thereby developing frictional forces therebetween to frictionally secure the plurality of pegs against sliding movement.

17. The holder of claim 12, wherein the plurality of slots include T-slots having a wide base region, a narrow neck region and a pair of shoulder surfaces separating the base region and the narrow neck region, and the plurality of pegs include a cooperating T-shaped section having a narrow neck portion and a wide base portion having a top surface, wherein with the plurality of pegs rotated to the first position the wide base portion is positioned to pass through the narrow neck region of the plurality of slots, and wherein with the plurality of pegs rotated to the second position the wide base portion is positioned to be unable to pass through the narrow neck region of the plurality of slots and the top surface of the wide base portion frictionally engages the shoulder surfaces securing the plurality of pegs against sliding movement.

18. The holder of claim 17, wherein the top surface of the wide base portion includes a compressible material which engages the shoulder surfaces with the plurality of pegs in the second position and is compressed thereby developing frictional forces therebetween to frictionally secure the plurality of pegs against sliding movement.

* * * * *

UNITED STATES PATENT AND TRADEMARK OFFICE
CERTIFICATE OF CORRECTION

PATENT NO.    : 6,375,134 B1
DATED         : April 23, 2002
INVENTOR(S)   : Ronald A. Rohm and Jack W. Goldschmidt It is certified that error appears in the above-identified patent and that said Letters Patent is hereby corrected as shown below:

<u>Title page,</u>
Item [75], Inventors, the order of inventorship is incorrect and should read:
-- Ronald A. Rohm -- as first inventor and -- Jack W. Goldschmidt -- as the second inventor.
Item [12], United States Patent, the patent inventor designation is incorrect and should read: -- Rohm et al. --

Signed and Sealed this

First Day of October, 2002

*Attest:*

*Attesting Officer*

JAMES E. ROGAN
*Director of the United States Patent and Trademark Office*